INVENTORS
BERTHOLD A. KNAUTH
AND PAO H. CHIN
BY
Semmes, Keegin, Robinson & Semmes
ATTORNEYS Patented Nov. 6, 1951

2,573,849

UNITED STATES PATENT OFFICE 2,573,849

THYRATRON SYSTEM OF CONTROL

Berthold A. Knauth, Bolton, N. Y., and Pao Hsiung Chin, Cranford, N. J., assignors, by direct and mesne assignments, to The Motorspeed Corporation, New York, N. Y.

Application March 1, 1948, Serial No. 12,326

7 Claims. (Cl. 318—345)

Our invention relates to controlling the firing angle of thyratron tubes in which it has many applications, such as arc-welding, resistance welding, servo mechanisms, the control of the rate of rotation of electric motors, and other applications which will be apparent from the ensuing description.

While the drawings illustrate the system as applied to the control of the rate of rotation of a direct current motor, it will be apparent that the system has many other applications in industry where similar electrical conditions are desired in operating circuits.

In the particular illustrations which we have shown in the drawings, one of the important objects of the invention is to maintain a constant speed, with automatic compensation for change in the load imposed on the motor. A particular use for this system is to maintain a constant speed in, for instance, a pumping mechanism, where the motor may be subjected to varying loads by reason of the change in viscosity of the liquid which is being pumped.

It is well-known that a counter E. M. F. is generated in the armature conductors of a D. C. motor when the armature is rotating so as to "cut" lines of magnetic flux as from a stationary magnetic field, and that when the magnetic field is unvarying the magnitude of this counter E. M. F. is approximately in direct proportion to the speed of the armature. The same phenomenon is in effect in a circuit where the armature is supplied with unidirectional pulses of current from an alternating-potential source through a grid-controlled gaseous-discharge rectifier tube and where the motor field is separately excited from a constant-potential source of direct current. However, in such a circuit the potential applied to the anode-cathode circuit of the rectifier tube is the difference between the potential of the power source and the counter E. M. F. across the terminals of the armature, hence a conduction of the rectifier can be started only during that portion of the positive half-cycle of the alternating-potential power source when the anode of the tube is positive with respect to its cathode. Once conduction of the rectifier is started, and because of the inductance of the armature winding, the rectifier remains conductive for a period of time after the potential of the alternating-potential source becomes less than the counter E. M. F. Neglecting the voltage drop across the rectifier tube, during conduction the wave form of the terminal voltage of the armature assumes the same wave form as the applied potential, and, after conduction the terminal voltage of the armature approaches in value the generated counter E. M. F., starting from a level of the instantaneous potential of the alternating potential power source as the instant of cessation of conduction and approaching the counter E. M. F. level with a continuously decreasing rate of change of potential. The fact of the armature terminal voltage approaching the counter E. M. F. value slowly, after conduction ceases, is due to characteristics of the electro-magnetic circuit of the motor armature itself.

The circuit of this invention relies, for its self-regulating motor-speed characteristics, on the following as well as other conditions and characteristics: (a) the use of the armature terminal voltage as a measure of speed at a time when no current flows into the armature and when, therefore, this voltage should be the counter E. M. F. potential proportional to true speed, and (b) the inherent modification of this armature terminal voltage, at a time when no current flows into the armature, by the "residual" electro-magnetic effect of the current which has just ceased to flow.

An object of this invention is to provide a thyratron regulator circuit for direct current motors that gives improved performance and yet is extremely simple.

Another object of this invention is to provide a thyratron control circuit for direct current motors that gives very smooth control of the motor operation.

A further object of this invention is to provide a thyratron control circuit for direct current motors employing a pair of thyratrons arranged so as to give very smooth control of the motor speed from substantially no load to full load.

A further object of this invention is to provide an electronic control circuit for direct current motors that gives smooth control of the speed of the motor from speeds as low as two or three R. P. M. to full speed under loads varying from substantially no load to full load.

Still another object of this invention is to provide an electronic control circuit for direct current motors adapted to regulate the speed of the motor from substantially no load to full load automatically, in which provision is also made for manual control.

Other and further objects of this invention will be apparent to those skilled in the art to which it relates from the following specification, claims and drawing.

Figure 1:
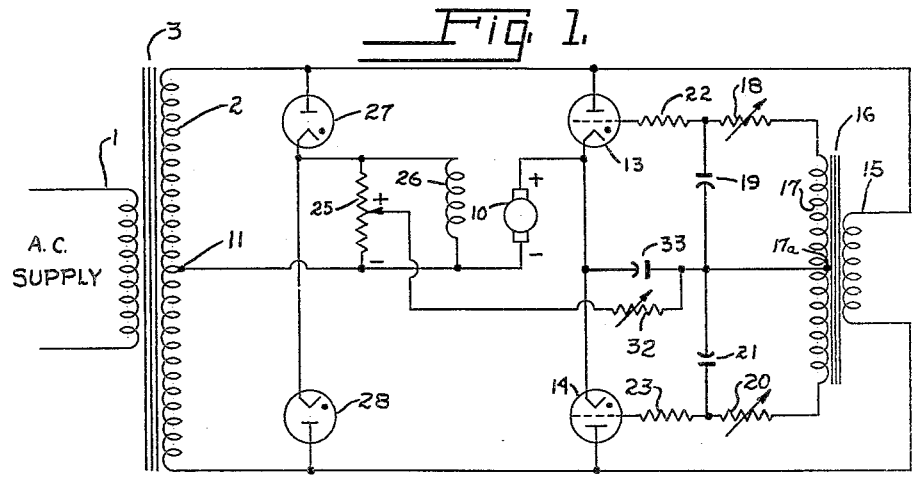
Figure 1 illustrates a schematic wiring diagram of one embodiment of thyratron control of this invention.

Referring to the drawing in detail, there is illustrated in Figure 1 thereof a circuit arrangement embodying a pair of thyratrons 13 and 14 having the anodes thereof connected to the opposite ends of the secondary 2 of the transformer 3. The primary 1 of the transformer 3 is connected to a substantially constant potential source of alternating current supply.

The thyratrons 13 and 14 function as grid controlled gaseous rectifiers for rectifying the output of the secondary 2 of the transformer 3 to supply the armature 10 of the direct current motor with unidirectional current pulses.

For this purpose one of the brushes of the armature 10 is connected to the cathodes of the thyratrons 13 and 14 and the other brush of the armature 10 is connected to the center tap 11 of the secondary 2. The direct current for the field winding 26 of the direct current motor is also supplied from the secondary 2 of the transformer 3 and rectifier tubes 27 and 28 which may be vacuum type or gaseous type rectifiers are provided for this purpose. The anodes of these rectifiers are connected to the ends of the secondary 2 and the cathodes are connected together and to one terminal of the field winding 26. The other terminal of the field winding 26 is connected to the center tap 11 of the secondary 2.

The rectifiers 27 and 28 also supply a direct voltage across the potentiometer 25 that is connected in parallel with the field winding 26. The variable contactor of the potentiometer 25 is connected to the variable resistor 32 and through this variable resistor 32 to the grid side of the capacitor 33, the other side of this capacitor 33 being connected to the cathode of the thyratrons 13 and 14.

The transformer 16 having a primary winding 15 and a secondary winding 17 is provided for the purpose of supplying alternating potential to the phase shifting networks connected to the grids of the thyratrons 13 and 14. The primary 15 of the transformer 16 is connected across the secondary 2 of the transformer 3 although, of course, it is obvious that the primary 15 may be connected across the primary 1 of the transformer 3 or the structure may be further simplified by simply coupling the secondary 17 to the primary 1 and dispensing with the primary 15.

The secondary 17 is connected across the phase shifting networks including the resistors 18 and 20 and the capacitors 19 and 21. The junction between the capacitors 19 and 21 is connected to the center tap 17a of the secondary 17 and is also connected to the grid side of the capacitor 33 and the grid side of the variable resistor 32. The junction between the variable resistor 18 and capacitor 19 of one of the phase shifting networks is connected to the grid current limiting resistor 22 and through this resistor to the grid of the thyratron 13. Likewise the junction between the variable resistor 20 and capacitor 21 of the other phase shifting network is connected to the grid current limiting resistor 23 and through this resistor to the grid of the thyratron 14.

In the operation of this circuit the thyratrons 13 and 14 function as grid controlled gaseous rectifiers and alternately pass through current pulses to the armature 10. Thus, during the half cycle when the anode of the thyratron 13 is positive this thyratron may be fired and caused to pass a direct current pulse to the armature 10. On the alternating half cycle when the anode of the thyratron 14 is positive this thyratron may be fired and caused to pass a direct current pulse to the armature 10 of the motor. This procedure continues as long as the thyratrons 13 and 14 are fired.

The field winding 26 of the motor is supplied with rectified A. C. from the diode rectifiers 27 and 28 so that this winding sets up a magnetic field that is "cut" by the winding of the armature 10 during rotation of this armature. As a result of this rotation the armature 10 generates a counter E. M. F. which is a direct current potential having a polarity such as to oppose the current fed to this armature from the thyratrons 13 and 14. This circuit is so arranged that the counter E. M. F. generated by the armature 10 is utilized in the grid circuit of the thyratrons 13 and 14 as part of the grid bias potential. This is accomplished by connecting the armature 10 across the capacitor 33 through the lower portion of the potentiometer 25 and through the resistor 32.

Thus the counter E. M. F. of the armature 10 is in series with the potential across the lower portion of the potentiometer 25 but in opposition thereto inasmuch as the lower portion of the armature 10 is negative with respect to the upper portion, and, likewise the lower terminal of the potentiometer 25 is negative with respect to the upper terminal. In this way if the counter E. M. F. of the armature 10 exceeds the grid potential derived from the potentiometer 25, the counter E. M. F. will retard or prevent the firing of the thyratrons 13 and 14. On the other hand if the grid potential derived from the potentiometer 25 exceeds the counter E. M. F. of the armature 10 of the thyratrons 13 and 14 are fired thereby and the firing may be advanced in the cycle depending upon the magnitude of the positive potential derived from the potentiometer 25. This may be varied by the variable contactor of this potentiometer. It may also be varied by the variable resistor 32 which is used as a speed control for the armature 10.

Figure 2:
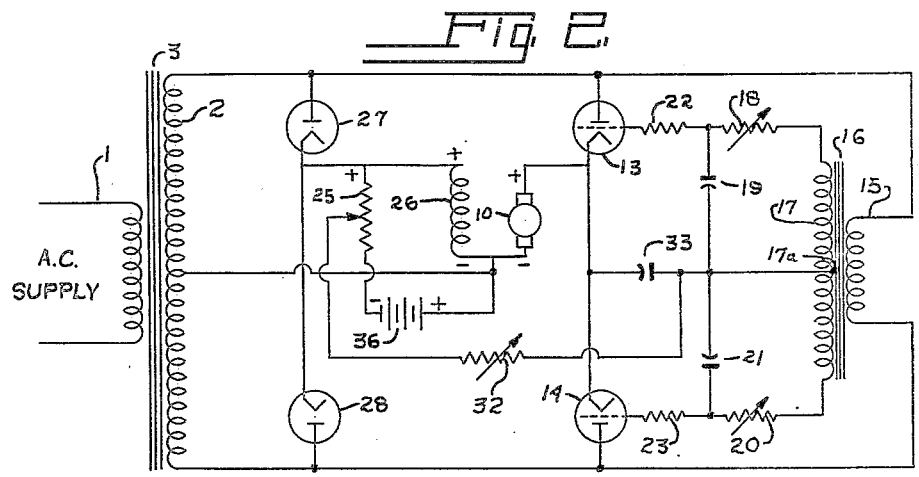
Figure 2 illustrates a modified form of thyratron control of this invention.

The circuit shown in Figure 2 is similar to that shown in Figure 1 and the same reference numerals are applied to corresponding parts of Figures 1 and 2. In Figure 2 an additional source of current supply 36 is connected with its positive terminal to the negative terminal of the field winding 26 and with its negative terminal to the lower terminal of the potentiometer 25 which would normally be negative with respect to the upper terminal. The upper terminal of the potentiometer 25 is connected to the cathodes of the rectifiers 27 and 28.

The source of direct current 36 is connected in additive sense to the voltage across the field winding 26 and the potentiometer 25 is connected to include voltage 26 plus voltage 36. The voltage which is selected by adjustment of the slider of potentiometer 25 is that which appears between this slider and the mid-tap of transformer winding 2; it is with this net voltage that the armature terminal voltage is compared.

Figure 3:
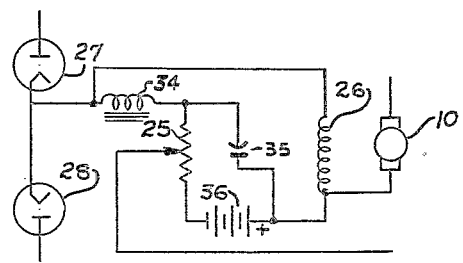
Figure 3 illustrates a further modified form of thyratron control circuit of this invention.

In order to further improve the speed regulation at higher speed a filter circuit consisting of the inductance 34 and the capacitor 35 is connected across the field winding 26 as shown in Figure 3. This filter circuit is adapted to filter out or smooth out the ripple occurring in the field voltage so as to eliminate the effect of this ripple on the grid voltage of the thyratrons 13 and 14 particularly at the higher armature speeds.

The ripple in the field voltage of the field winding 26 may be caused by improperly filtered field potential applied to the winding from the full wave rectifiers 27 and 28 or it may be induced by changes produced in the magnetic circuit of the field winding by the rotation of the armature.

While we have shown our system as applied in the control of a direct current motor it will be obvious that the system is useful in many other connections and that the immediate application has been illustrated and described merely to illustrate the invention. We desire that our invention be limited only by the scope of the appended claims and the showing of the prior art.

We claim:

1. A thyratron control system for direct current motors comprising a pair of thyratrons each having an anode, a grid and a cathode, a direct current motor having a field winding and an armature, one side of said armature being connected to said thyratron cathodes, a pair of phase shifting circuits connected between the grids of said thyratrons, a transformer having connections for connecting the center tap of the secondary thereof to the other side of said motor armature, connections for connecting the ends of said secondary to said thyratron anodes, a source of direct current for said motor field winding, a capacitor connected between the cathodes of said thyratrons and the junction of said pair of phase shifting circuits, and a means for applying at least a part of the voltage across said field winding in series opposition to said armature voltage across said capacitor.

2. A thyratron control system for controlling a direct current motor comprising a thyratron having an anode, a grid and a cathode, a direct current motor having an armature connected in series with said thyratron across an alternating current supply, a phase shifting circuit connected to said thyratron grid, a transformer connected to said alternating current supply and to said phase shifting circuit, a rectifier connected to said alternating current supply for supplying direct current to the field of said motor, a potentiometer having one end connected to said motor field winding, an auxiliary source of current supply connected to the other end of said field winding and to the other end of said potentiometer, and connections for connecting the variable contactor of said potentiometer to the secondary of said transformer for controlling the grid bias potential applied to the grid of said thyratron from said direct current supply.

3. A thyratron control system for controlling a direct current motor comprising a thyratron having an anode, a grid and a cathode, a direct current motor having a field winding and armature, said armature being connected in series with said thyratron across an alternating current supply, a phase shifting circuit connected to said thyratron grid, a transformer connected to said alternating current supply for supplying potential to said phase shifting circuit, a rectifier connected to said alternating current supply for supplying direct current to the field of said motor, a filter connected to said field for filtering the ripple in the rectified alternating current, a resistor connected across said filter, and connections for connecting variable portions of said resistor in series with the secondary of said transformer for controlling the firing of said thyratron.

4. A thyratron control system for direct current motors comprising a pair of thyratrons each having an anode, a grid and a cathode, said thyratrons having the cathodes connected together, a transformer having a center tapped secondary, the ends of said secondary being connected to the anodes of said thyratrons, a motor having an armature connected between the cathodes of said thyratrons and the center tap of said secondary, phase shifting circuits joined together and connected to the grids of said thyratrons, a field winding for said motor, a source of direct current for said field winding, a potentiometer connected across said field winding, one end of said field winding being connected to said center tap of said secondary and to one end of the armature of said motor and said phase shifting circuit, a source of alternating current potential connected across said phase shifting circuits, means for connecting the variable contactor of said potentiometer to said source of alternating current potential, and a capacitor connected between the cathodes of said thyratrons and the junction of said phase shifting circuits.

5. A thyratron control system for controlling a direct current motor comprising a pair of thyratrons having an anode, a grid and a cathode, a direct current motor having the positive terminal of its secondary connected to the anodes of the thyratrons, an alternating current supply, a first transformer with its primary connected to the alternating current supply and having the ends of its secondary connected to the anodes of the thyratrons, a center tap in said secondary connected to the negative terminal of the armature, a rectifier connected to the secondary to supply a direct current to the field of the motor, said field having its negative terminal connected to the center tap of the secondary, a potentiometer connected across the field of the motor, a second transformer having its primary connected across the secondary of the first transformer, a phase shifting circuit connected to the grids of each of the thyratrons and to the secondary of the second transformer, a center tap on the secondary of the second transformer, a capacitor connected between the cathodes of the thyratrons and the center tap of the secondary of the second transformer and a conductor joining the variable contactor of the potentiometer with the center tap of the secondary of the second transformer to impose a voltage component from the armature and the potentiometer on the grids.

6. A thyratron control system for controlling a direct current motor comprising a pair of thyratrons having an anode, a grid and a cathode, a direct current motor having the positive terminal of its armature connected to the cathodes of the thyratrons, an alternating current supply, a first transformer with its primary connected to the alternating current supply and having the ends of its secondary connected to the anodes of the thyratrons, a center tap in said secondary connected to the negative terminal of the armature, a rectifier connected to the secondary to supply a direct current to the field of the motor, said field having its negative terminal connected to the center tap of the secondary, a potentiometer having a direct current source in series therewith with the negative terminal of the direct current source connected to the negative terminal of the potentiometer connected across the field of the motor, a second transformer having its primary connected across the secondary of the first transformer, a phase shifting circuit connected to the grids of each of the thyratrons and to the secondary of the second transformer, a center tap on the secondary of the second transformer, a capacitor connected between the cathodes of the thyratrons and the center tap of the secondary of the second transformer and a conductor joining the variable contactor of the potentiometer with the center tap of the secondary of the second transformer to impose a voltage component from the armature and the potentiometer on the grids.

7. A thyratron control system for controlling a direct current motor comprising a pair of thyratrons having an anode, a grid and a cathode, a direct current motor having the positive terminal of its armature connected to the cathodes of the thyratrons, an alternating current supply, a first transformer with its primary connected to the alternating current supply and having the ends of its secondary connected to the anodes of the thyratrons, a center tap in said secondary connected to the negative terminal of the armature, a rectifier connected to the secondary to supply a direct current to the field of the motor, said field having its negative terminal connected to the center tap of the secondary, a potentiometer having a direct current source in series therewith connected across the field of the motor, a filter connected across the field for filtering the ripple in the rectified current, a second transformer having its primary connected across the secondary of the first transformer, a phase shifting circuit connected to the grids of each of the thyratrons and to the secondary of the second transformer, a center tap on the secondary of the second transformer, a capacitor connected between the cathodes of the thyratrons and the center tap of the secondary of the second transformer and a conductor joining the variable contactor of the potentiometer with the center tap of the secondary of the second transformer to impose a voltage component from the armature and the potentiometer on the grids.

BERTHOLD A. KNAUTH.
PAO HSIUNG CHIN.

REFERENCES CITED

The following references are of record in the file of this patent:

UNITED STATES PATENTS

| Number | Name | Date |
|---|---|---|
| 2,082,496 | Howe | June 1, 1937 |
| 2,376,169 | Moyer | May 15, 1945 |
| 2,422,567 | Puchlowski | June 17, 1947 |